United States Patent [19]

Gillespie et al.

[11] 4,007,131
[45] Feb. 8, 1977

[54] HYDROPROCESSING CATALYST REGENERATION

[75] Inventors: Bernard M. Gillespie, Pitman; Henry R. Ireland, Woodbury; Thomas R. Stein, Cherry Hill, all of N.J.

[73] Assignee: Mobil Oil Corporation, New York, N.Y.

[22] Filed: Sept. 22, 1975

[21] Appl. No.: 615,741

Related U.S. Application Data

[63] Continuation of Ser. No. 438,158, Jan. 31, 1974, abandoned.

[52] U.S. Cl. .............................. 252/419; 208/108; 208/111; 208/216; 208/217
[51] Int. Cl.² .................... B01J 29/38; B01J 21/20; B01J 37/14
[58] Field of Search ........... 252/419, 416; 208/111, 208/216, 217, 108

[56] References Cited

UNITED STATES PATENTS

| | | | |
|---|---|---|---|
| 3,533,960 | 10/1970 | Weinert | 252/419 |
| 3,764,558 | 10/1973 | Tse et al. | 252/419 |

FOREIGN PATENTS OR APPLICATIONS

| | | | |
|---|---|---|---|
| 962,778 | 7/1964 | United Kingdom | 252/419 |
| 1,021,966 | 3/1966 | United Kingdom | 252/419 |
| 1,043,091 | 9/1966 | United Kingdom | 252/419 |

*Primary Examiner*—Winston A. Douglas
*Assistant Examiner*—P. E. Konopka
*Attorney, Agent, or Firm*—Charles A. Huggett; Vincent J. Frilette

[57] ABSTRACT

This invention concerns a method of regenerating hydroprocessing catalyst. The invention deals with a method of regenerating hydroprocessing catalyst contained within a reactor, said catalyst having been deactivated by "coke" deposition, comprising: passing into an inlet of said reactor, through said catalyst to be regenerated, and out an outlet of said reactor, a stream of substantially inert gases initially containing about 0.1 to 4.0 volume percent oxygen at an initial temperature of about 600° to 1200° F, a pressure of at least about 100 psig and a space velocity of at least about 50 GHSV; and increasing said oxygen concentration to about 1.0 to 10.0 volume % and/or increasing the temperature to about 800° to 1200° F upon detection of oxygen at said outlet of said catalyst containing reactor.

5 Claims, 7 Drawing Figures

Regeneration Time, Hrs

COKE VS. DEPTH

HYDROPROCESSING CATALYST REGENERATION

CROSS-REFERENCE TO RELATED APPLICATIONS

This application is a continuation of copending U.S. patent application Ser. No. 438,158, filed Jan. 31, 1974, now abandoned.

BACKGROUND OF THE INVENTION

1. Field of the Invention

This invention concerns a method of regenerating hydroprocessing catalyst. More particularly, this invention relates to a means of regenerating hydroprocessing catalyst in a reduced time period as compared with prior regeneration procedures.

2. Description of the Prior Art

Hydrocracking may be regarded as a combination of cracking, hydrogenation and isomerization. It may also be described as a treating operation, as hydrogen combines with, and practically eliminates, contaminants in the feed such as sulfur and nitrogen. Typical hydrocracking catalysts have both a cracking component, such as silica alumina, and a reforming agent such as platinum, nickel and/or tungsten oxide.

Commercial hydrocracking processes are operated at temperatures between about 400° and 800° F and at pressures from about 100 to 3,000 psig. Operating severity and hydrogen consumption are dependent upon feedstock and the particular product distribution required, as well as the process itself and the catalyst used. A typical process flow consists of mixing hydrogen with a refractory gas oil derived from cracking and/or coking operations, or a virgin or heavy gas oil. This mixture of hydrogen and gas oil is then heated and contacted with catalyst in a fixed-bed reactor at a specified hydrogen pressure. Most feedstocks require pretreatment; in some processes this is the first step in the two-stage system.

As a result of complex hydrocarbon processing reactions in a hydrocracker reactor, a carbonaceous deposit is laid down on the catalyst which is referred to by petroleum engineers as "coke". This deposit of coke on the catalyst tends to seriously impair the catalyst efficiency for the principal reaction desired and to substantially decrease the rate of conversion and/or the selectivity of the process. The purpose of regenerating catalyst (whether a one or two stage cracking operation) is to restore catalyst activity by removing coke and other impurities laid down during normal operation. This is accomplished by contacting the catalyst with a dilute oxygen-inert gas mixture at controlled temperature in order to burn off impurities. Metal sulfides on the catalyst are converted to oxides with the liberation of sulfur oxides ($SO_2$ and $SO_3$). The use of dilute oxygen limits the temperature rise from the heat of combustion.

The time between replacements of hydrocracker catalyst can be significantly increased, with resultant savings in catalyst cost and plant downtime through the use of in-place regeneration.

A conventional hydrocracker catalyst regeneration employs several "burns" (generally at least 3) wherein dilute oxygen is contacted with the catalyst. The oxygen supports combustion of the coke and forms CO and $CO_2$ as oxidation products. A typical initial or first burn has a reactor inlet temperature of about 650° F. As the oxygen burns the coke, a temperature increase dependent on the oxygen concentration is experienced. The coke burns progressively "down" the reactor, the temperature of which is monitored by thermocouples. The amount of oxygen utilized for regeneration is approximately 0.1 to 4.0 volume percent oxygen mixed with recirculating nitrogen gas; due to this rather small oxygen volume percent, the time period required for the exotherm or "wave" to reach the bottom of a typical reactor filled with catalyst is several hours. Larger oxygen concentrations may not be utilized as too large a temperature increase would be produced exceeding the catalyst stability capacity and/or the metalurgical limits of the reactor. Only after the exotherm reaches the bottom of the catalyst bed does the recirculated gas begin to show traces of unused oxygen upon exiting the reactor. In order to insure that the bulk of the coke burnable at a given temperature had indeed been oxidized, the temperature is not increased until the oxygen content of the gases having passed through the catalyst is substantially the same (80 to 90% of initial) as the oxygen initial content of 0.1 to 4.0 which entered the catalyst bed.

The above description of hydrocracker catalyst regeneration is understood to be applicable to the in-place regeneration of other hydroprocessing catalyst having similar characteristics.

While in-place regenerations allow for decreased plant downtime when compared with catalyst replacement, such a regeneration exposes the catalyst to harmful substances such as $H_2O$, $SO_2$ and $CO_2$ formed during the coke oxidation.

It is an objective of this invention to provide for an improved hydroprocessing catalyst regeneration.

It is a purposes of this invention to reduce the time required for in-place hydrocracker regeneration.

It is an objective of this invention to reduce hydrocracker catalyst exposure to substances such as $H_2O$, $SO_2$ and $SO_3$ and $CO_2$ formed during the coke oxidation.

Other and additional objectives and purposes of this invention will become apparent upon an examination of the entire specification and drawings, including the claims.

SUMMARY OF THE INVENTION

Detailed study of the regeneration temperature exotherm of hydroprocessing catalyst being regenerated, which in turn is a function of the oxygen concentration and of the amount and location of coke deposited on the catalyst, coupled with an analysis of the effect of the coke oxidation mechanism on hydroprocessing catalysts have led to the development of the following improved hydroprocessing catalyst regeneration procedure:

A method of regenerating hydroprocessing catalyst contained within a reactor, said catalyst having been deactivated by coke deposition, comprising: passing into an inlet of said reactor, through said catalyst to be regenerated, and out an outlet of said reactor, a stream of substantially inert gases initially containing about 0.1 to 4.0 volume percent oxygen at an initial temperature of about 600° to 1200° F, a pressure of at least about 100 psig and a space velocity of at least about 50 GHSV and increasing said oxygen concentration to about 1.0 to 10.0% by volume and/or increasing the temperature to about 800° to 1,200° F upon detection of oxygen at said outlet of said catalyst containing reactor.

In a preferred embodiment said initial temperature is about 675° to 850° F, and said increased temperature is 800° to 1000° F, said increased temperature being held for a minimum of 6 hours while maintaining the oxygen content at about 2.0 volume percent. In a further preferred embodiment, the hydroprocessing catalyst is a typical hydrodesulfurization catalyst having a hydrogenation-dehydrogenation component such as a Group VIII metal on a solid base, and the initial and increased temperatures are about 625° to 1050° F and about 900° to 1050° F, respectively.

FIG. 1 illustrates the improvement of this invention over conventional hydroprocessing regeneration methods, the method of this invention being further defined by FIGS. 3-6.

DESCRIPTION OF SPECIFIC EMBODIMENTS

Figure 2:
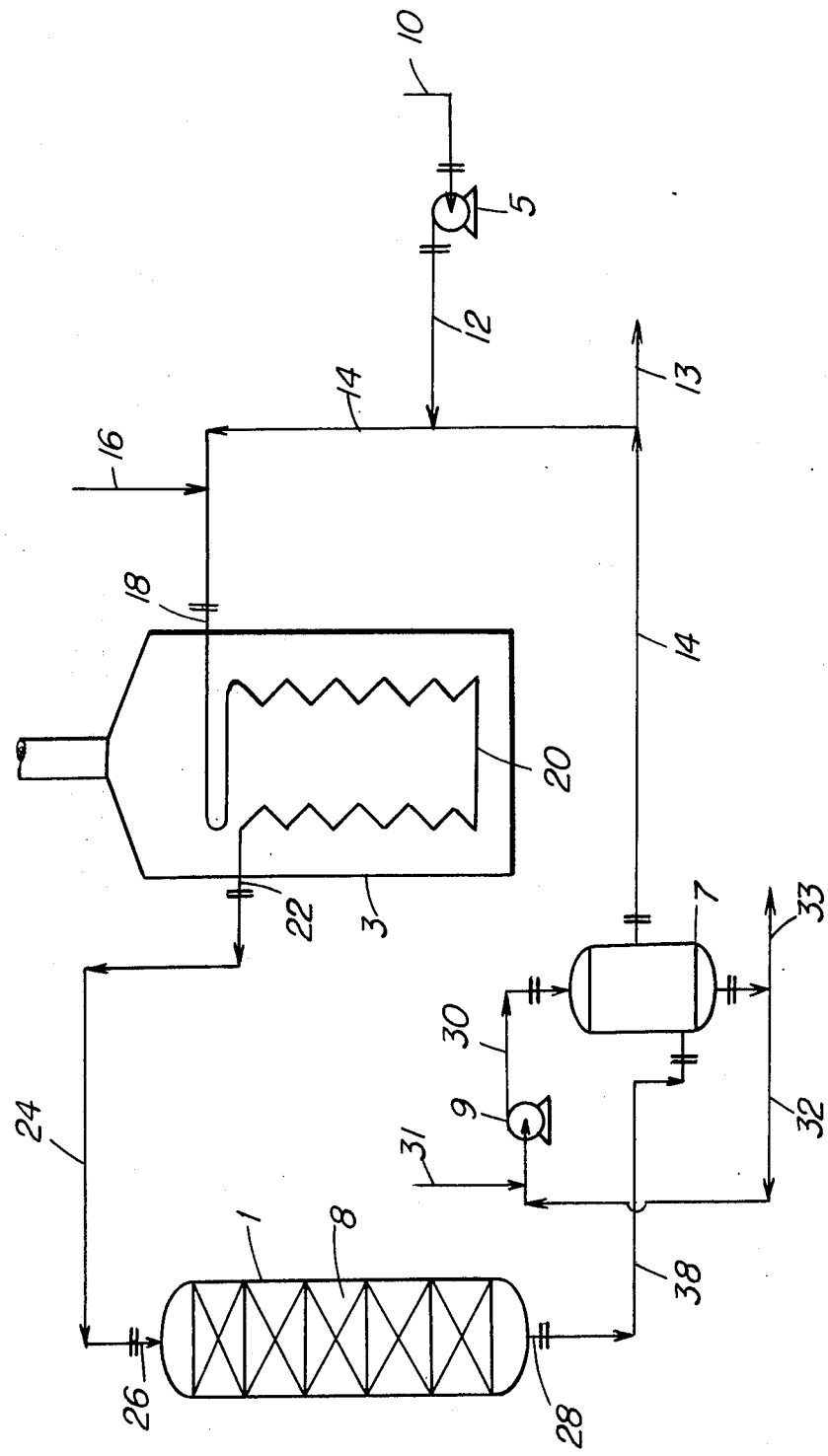
FIG. 2 is a schematic drawing of a hydroprocessing unit.
Figure 3:
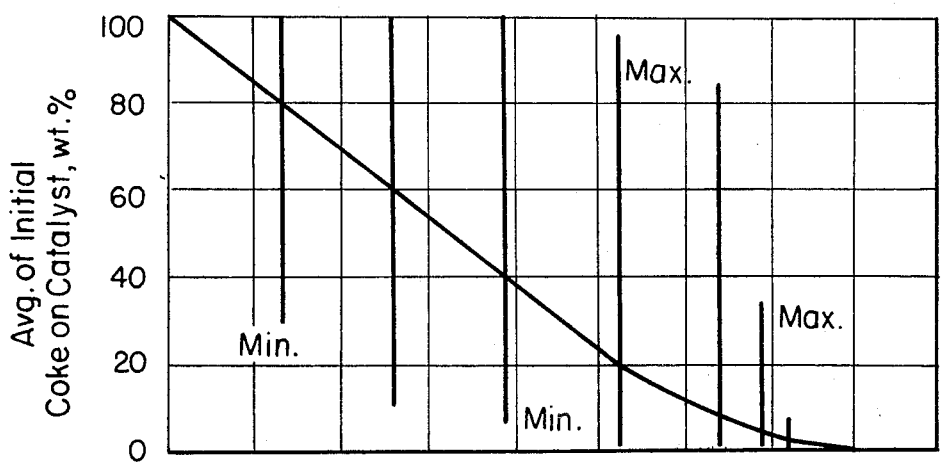
FIGS. 3-6 are graphs indicating the various regeneration conditions as a function of time for a regeneration of the method of this invention.
Figure 4:
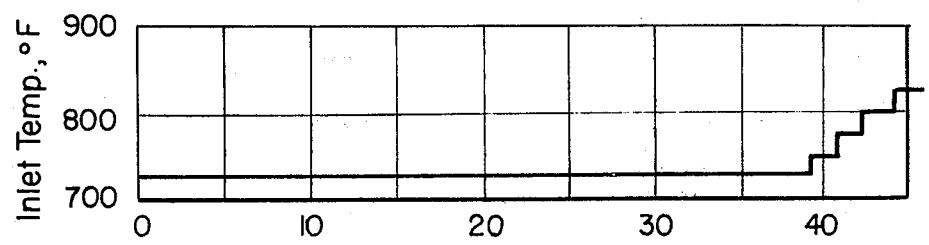
Figure 5:
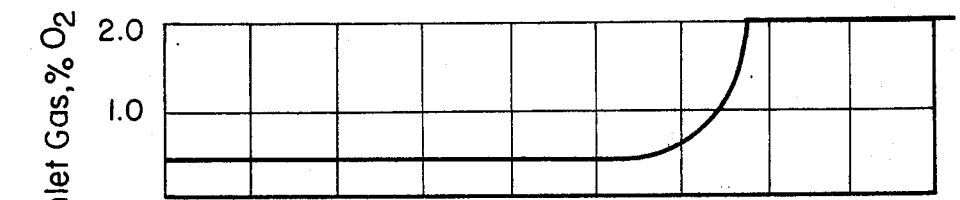
Figure 6:
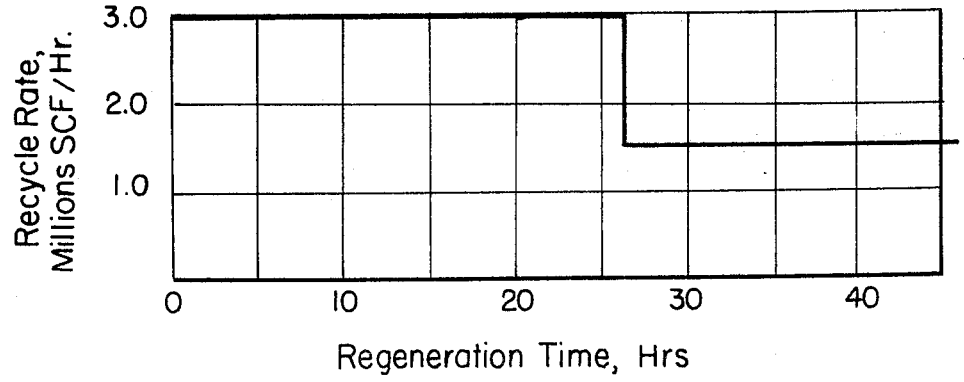

Referring to FIG. 2, a reaction 1 is filled with a catalyst, generally layered in a plurality of beds such as the bed 8. Inert gas may be added through a line 16 to a furnace 3 by means of a line 14 which is connected to an inlet 18 of the furnace 3; inert gas is removed through a line 13. Added to this inert gas stream is air supplied by an air compressor 5 having a suction 10 and a discharge 12 connected to the line 14 connected to the furnace inlet 18. This air diluted with inert gas is heated in the furnace 3 as it passes through a furnace coil 20. The heated gases then pass through a furnace outlet 22 and an outlet line 24 to the catalyst containing reactor 1 by means of a reactor inlet 26. The oxygen in the air supports combustion of the coke on the catalyst. The combustion reaction products, $H_2O$ and $CO_2$ (and $SO_2$ and $SO_3$ produced from sulfur deposited on the catalyst) are generated in the reactor, and together with the inert gas which is recirculated, pass out of the reactor through an outlet 28. The gases then pass into a line 38 which is connected to a vessel 7 wherein the sulfur oxides and the $CO_2$ are neutralized by means of contact with a caustic solution, supplied by a line 31 to a pump 9 having a discharge 30 and a suction 32, from which caustic solution is withdrawn through a line 33, as these compounds would damage the catalyst if recycled.

EXAMPLES 1-2

Figure 1:
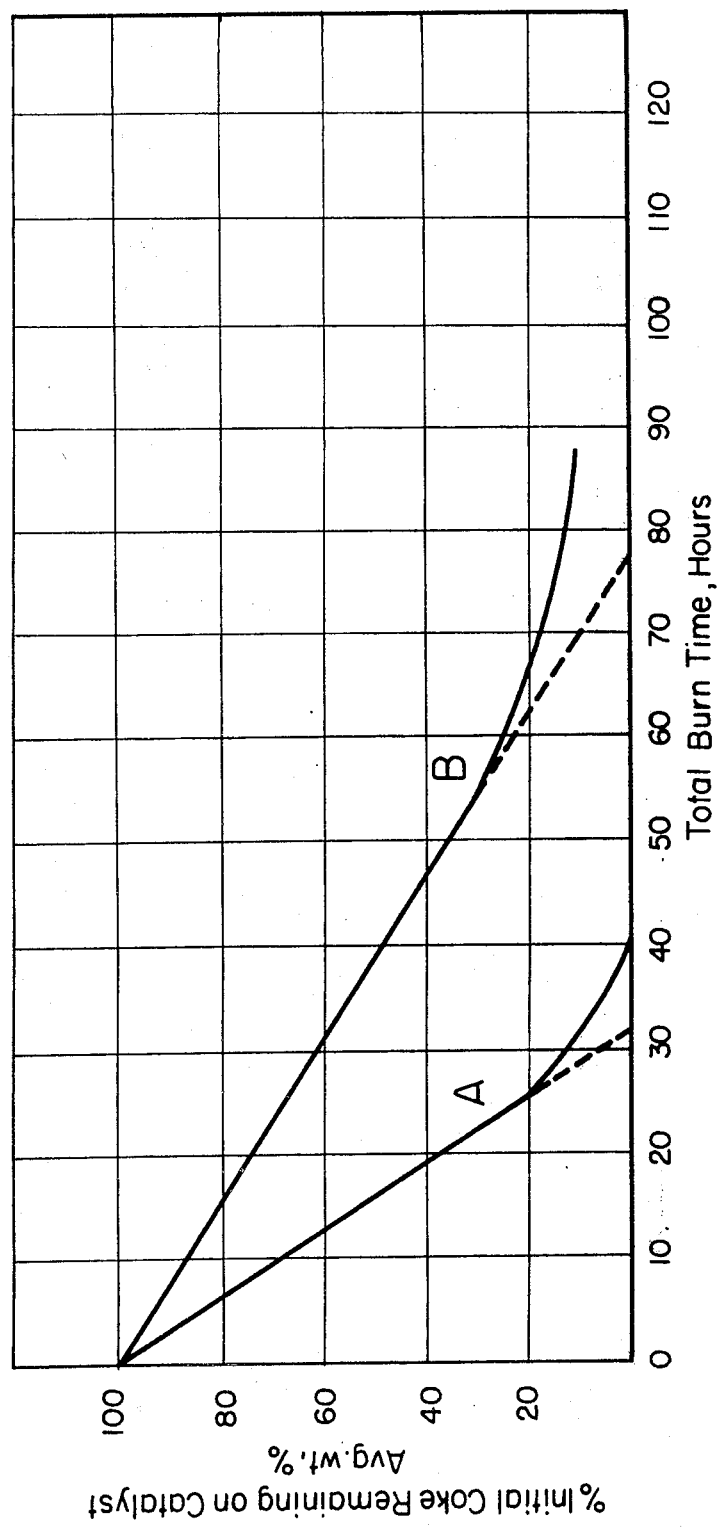
FIG. 1 is a graph comparing the total catalyst regeneration time required for the conventional method of regeneration as compared with the method of this invention.

A regeneration conducted under the conventional conditions of 1.5 million SCF/hr. recycle rate, 0.5% by volume $O_2$ at reactor inlet and an inlet temperature of 650° F (curve B) is plotted against a regeneration in accordance with this invention having the following conditions: 3.05 million SCF/hr. recycle ratio, and oxygen inlet concentration of 0.4% by volume and an inlet temperature of 725° F (curve A) in FIG. 1. The dotted extensions of each curve illustrate the theoretical optimum where all oxygen is burned, the burning taking place at or near the catalyst thermal stability limits or the metalurgical limits of the reactor as determined by the reactor's construction.

An examination of FIG. 1 illustrates that when following conventional regeneration procedures as shown by curve B, until about 53 hours into the process, the regeneration is proceeding at optimum conditions, i.e. all the oxygen is being consumed. However, the "burn" is not completed until the oxygen concentration at the reactor outlet is about 80-90% of the inlet oxygen (this occurs at about 88 hours). During this 35 hour period oxygen is being "wasted" in that the actual curve deviates from the optimum due to the fact that not all the oxygen is being consumed. The regeneration procedure of this invention eliminates to a substantial extent of this "waste" by providing for a process which allows for the immediate increase in oxygen concentration and/or inlet temperature upon oxygen breakthrough.

EXAMPLES 3-4

Figure 7:
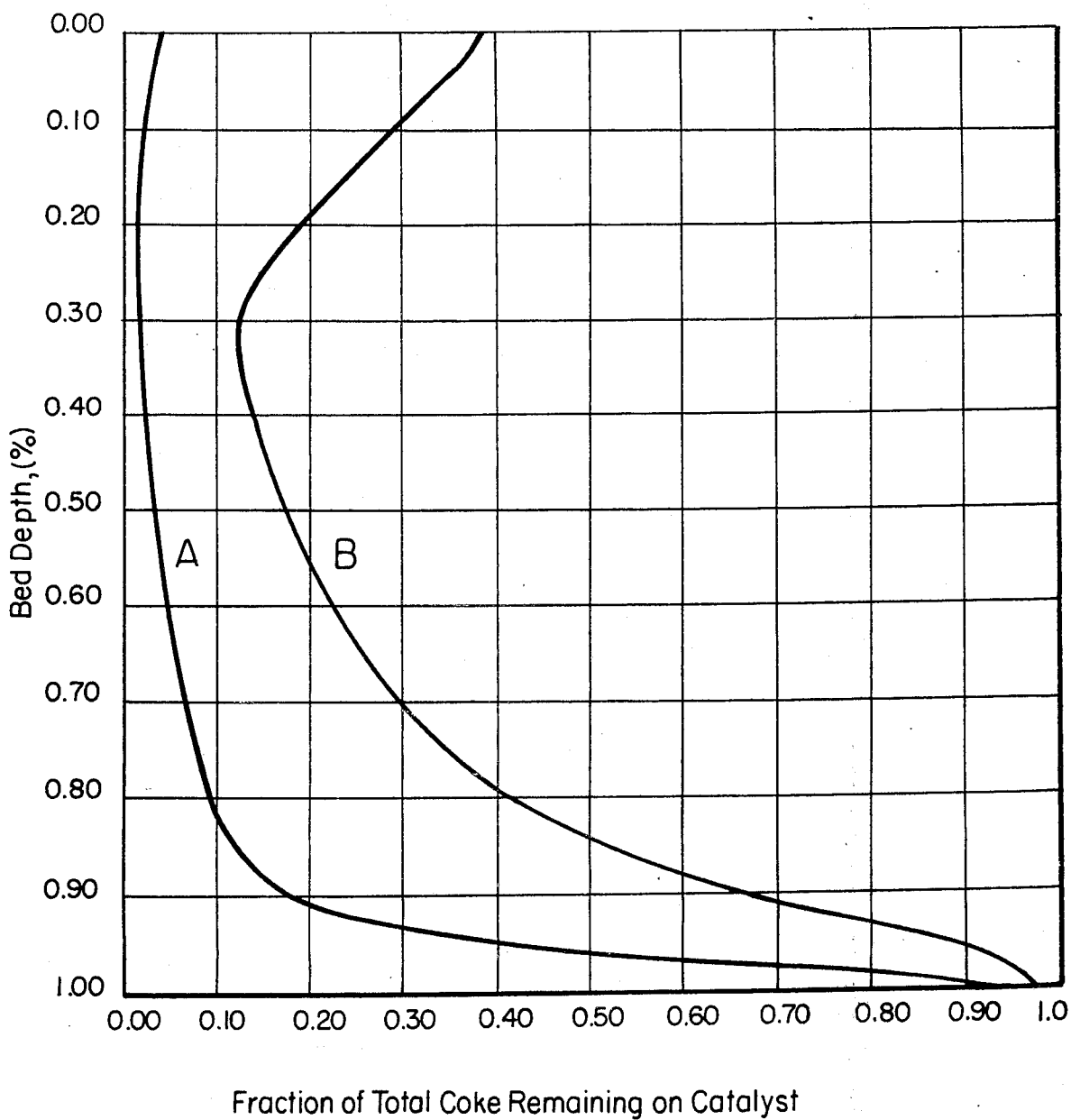
FIG. 7 is a graph further illustrating this invention.

A conventional regeneration as described in Examples 1-2 produces a graph of percent total coke remaining on the catalyst as a function of bed depth at a point in the regeneration when oxygen has first become detected at the bottom of the bed as shown by curve B of FIG. 7. A regeneration of the type of this invention produces a curve A as shown in FIG. 7.

An examination of curve B of FIG. 7 shows that a substantial amount of coke remains on the hydroprocessing catalyst at the upper and lower portions of the bed. The unoxidized coke of the upper portion of the bed is apparently at least partly due to the fact that the temperature of the burning or regenerating procedure increases as the oxygen carrying gases pass through the bed due to the heat produced by the burning coke. Thus the temperature of the midpoint of the bed is at a higher temperature than the upper portion since the temperature has been increased due to the coke burning. The relatively high volume of unoxidized coke at the bottom part of the bed is apparently due to the fact that the curve represents percent coke remaining on the catalyst at the point of oxygen breakthrough at the reactor outlet. The fact that oxygen begins to exit the bed indicates that a portion of the oxygen is not being utilized for oxidation, as the oxygen is not being completely utilized the gas temperature decreases and the percent of total coke remaining on the catalyst increases correspondingly.

It is the large volume of coke at the lower portion of the bed under the conventional regeneration which required the inlet temperature held constant while the bottom portion of the bed was further oxidized (at a slower rate than previous burning as less and less oxygen is being consumed). Were this volume of coke at the bottom of the bed not decreased prior to increasing the inlet temperature, thus providing a second regenerating exotherm, excessively high temperatures could be experienced when the second exotherm reached the bottom portion of the bed.

A regenerative procedure of this invention begins with a higher inlet temperature than the conventional regeneration of curve B. As shown in FIG. 7 by curve A, such a regeneration not only reduces the amount of coke remaining on the catalyst at the upper and middle portions of the bed, such a regeneration procedure also markedly decreases the volume of unburned coke at the bottom portion thereby allowing for an immediate oxygen concentration and/or temperature increase upon oxygen breakthrough.

What is claimed is:

1. In the multiple burn method of regenerating coked, deactivated hydrocracking catalyst contained within a reactor, which method comprises preheating a gas stream consisting essentially of about 0.5 volume percent oxygen in a substantially inert gas to an initial temperature of about 650° F, passing said preheated stream into an inlet of said reactor, through said catalyst to be regenerated, and out an outlet of said reactor at a pressure of at least about 100 psig and a space velocity of at least about 50 GHSV, continuing said passing of said preheated stream until the concentration of oxygen at the outlet of said reactor is substantially the same as the concentration at said inlet, whereby completing a first burn, and then increasing said initial temperature of said preheated stream at least once to induce at least a second burn, the improvement, whereby reducing regeneration time and catalyst deterioration, which comprises:

initiating said first burn with said initial temperature increased by 25° to 150° F, said oxygen concentration decreased, and said space velocity increased by an amount sufficient to increase the burning rate, and continuing said passing of said preheated stream until only about 80% of said coke is burned and only until oxygen breakthrough occurs at said outlet of said reactor, and then increasing further said increased preheat temperature, or increasing said decreased oxygen concentration, or both, thereby removing substantially all the remainder of said coke.

2. The improved process described in claim 1 wherein said initial temperature is increased to about 725° F.

3. The improved process described in claim 2 wherein said oxygen concentration is decreased by about 20% and said space velocity is about doubled.

4. The improved process described in claim 1 wherein said further increased increased initial temperature is maintained for a period of at least 6 hours.

5. The improved process described in claim 3 wherein said further increased increased initial temperature is maintained for a period of at least 6 hours.

* * * * *